United States Patent
Dierdorf et al.

(10) Patent No.: US 8,309,228 B2
(45) Date of Patent: Nov. 13, 2012

(54) COATINGS CONTAINING POLYSILAZANES FOR METAL AND POLYMER SURFACES

(75) Inventors: Andreas Dierdorf, Hofheim (DE); Stefan Brand, Hirschberg-Leutershausen (DE); Andreas Wacker, Mannheim (DE); Hubert Liebe, Wiesbaden (DE)

(73) Assignee: AZ Electronic Materials (Luxembourg) S.A.R.L., Luxembourg (LU)

( * ) Notice: Subject to any disclaimer, the term of this patent is extended or adjusted under 35 U.S.C. 154(b) by 775 days.

(21) Appl. No.: 11/991,718

(22) PCT Filed: Aug. 25, 2006

(86) PCT No.: PCT/EP2006/008352
§ 371 (c)(1), (2), (4) Date: Jul. 31, 2009

(87) PCT Pub. No.: WO2007/028511
PCT Pub. Date: Mar. 15, 2007

(65) Prior Publication Data
US 2009/0286086 A1 Nov. 19, 2009

(30) Foreign Application Priority Data
Sep. 8, 2005 (DE) .......................... 10 2005 042 944

(51) Int. Cl.
*B32B 15/04* (2006.01)
*B05D 3/02* (2006.01)
*C08L 83/04* (2006.01)

(52) U.S. Cl. .................. 428/451; 427/388.1; 427/388.2; 427/388.5; 427/409; 428/323; 428/450; 524/588

(58) Field of Classification Search ............... 427/388.1, 427/388.2, 388.5, 409; 428/450, 451, 323; 524/588
See application file for complete search history.

(56) References Cited

U.S. PATENT DOCUMENTS

| 5,922,411 | A * | 7/1999 | Shimizu et al. ............. 427/397.7 |
| 6,383,641 | B1 | 5/2002 | Kondou et al. |
| 2003/0083453 | A1 | 5/2003 | Lukacs, III et al. |
| 2003/0099843 | A1 * | 5/2003 | Aoki et al. .................... 428/446 |
| 2003/0164113 | A1 | 9/2003 | Suzuki |

FOREIGN PATENT DOCUMENTS

| WO | WO 02/088269 A1 | 11/2002 |
| WO | WO 2004/039904 A1 | 5/2004 |

* cited by examiner

*Primary Examiner* — D. S. Nakarani
(74) *Attorney, Agent, or Firm* — Sangya Jain

(57) ABSTRACT

The invention relates to the use of polysilazanes as a permanent coating on metal and polymer surfaces for preventing corrosion, increasing scratch resistance and to facilitate easier cleaning. The invention comprises a solution of a polysilazane or a blend of polysilazanes of the general formula 1

$$—(SiR'R''—NR''')_n— \qquad (1)$$

where R', R'' and R''' are identical or different and independently of one another represent hydrogen or an optionally substituted alkyl, aryl, vinyl or (trialkoxysilyl)alkyl group and n represents a whole number and is calculated in such a way that the polysilazane has a numerical average molecular weight of 150 to 150 000 g/mol, in a solvent. The invention also relates to a method for producing the coating.

21 Claims, No Drawings

COATINGS CONTAINING POLYSILAZANES FOR METAL AND POLYMER SURFACES

The present invention relates to the polysilazane-based coating for producing an easy-to-clean protective coating for metal or plastic surfaces. Particularly good properties are exhibited by the coating as a protective coating for wheel rims, particularly for aluminum rims.

The use of aluminum wheel rims in automobile construction has increased greatly in recent years. On the one hand the lighter aluminum rims offer weight advantages over steel rims and so enable fuel savings, but the essential aspect is that aluminum rims are used above all for esthetic reasons, since they give the vehicle a high-value and refined appearance.

A disadvantage of aluminum rims is in particular their susceptibility to corrosion and their propensity to soiling. Moreover, scratches on the glossy surface of an aluminum rim are much more noticeable than on a steel rim. For this reason aluminum rims are provided at the end of the manufacturing operation with a coating, which is generally composed of a pretreatment of the aluminum (chromating or chromate-free), a primer, a pigmented basecoat and, lastly, a clearcoat. This complex coating is needed in order to ensure sufficient corrosion protection. In spite of the coating, corrosion causes problems, through the use, for example, of gritting salt in the winter. Finally, brake dust which deposits on the aluminum rim over time likewise eats into the coating and can no longer be removed. Moreover, when snow chains are used, the aluminum rims are easily scratched. Another cause of scratches is the cleaning of the aluminum rims with abrasive tools, such as brushes or sponges.

Also becoming more and more widespread are polished or bright-machined aluminum rims, whose surface consists of an esthetically appealing, glossy surface of pure aluminum, protected only by a thin clearcoat, in order to retain the natural gloss of the aluminum. With this kind of rims the corrosion protection by means of the thin clearcoat, which moreover ought to be as invisible as possible to the human eye, is very difficult to bring about.

WO 02/088 269 A1 describes the use of a perhydropolysilazane solution for producing hydrophilic, dirt-repellent surfaces. The description there includes that of use in the automobile sector (on the bodywork and the rims), and perhydropolysilazane solutions with a weight fraction of 0.3% to 2% are recommended. Example 1 there uses a highly dilute solution with a weight fraction of only 0.5% perhydropolysilazane, with which a very thin coating is obtained on steel, with a coat thickness of about 0.2 micrometer.

A coating so thin is first incapable of preventing scratching of the paint surface and is also incapable of ensuring sufficient corrosion protection or of preventing the eating-in of brake dust. Moreover, the thin coat is not enough to level the relatively inhomogeneous clearcoat and to produce a truly smooth, glassy surface readily amenable to cleaning.

The object on which the present invention was based was to develop a coating with which it is possible to provide wheel rims with a hard, scratch-resistant coating which is easier to clean and which protects the aluminum rim against corrosion and against the eating-in of brake dust.

Surprisingly it has now been found that with polysilazanes it is possible to produce sufficiently thick protective coats which protect the rim against corrosion, scratching and eating-in of brake dust and also make it easier to clean the rim.

The invention accordingly provides for the use of polysilazanes for the coating of metal surfaces and polymers, comprising a solution of a polysilazane or a mixture of polysilazanes of the formula 1

$$-(SiR'R''-NR''')_n- \quad (1)$$

where R', R" and R'" are identical or different and independently of one another are hydrogen or an unsubstituted or substituted alkyl, aryl, vinyl or (trialkoxysilyl)alkyl radical, n being an integer and having a value such that the polysilazane has a number-average molecular weight of 150 to 150 000 g/mol, in a solvent.

Particularly suitable here are polysilazanes in which R', R" and R'" independently of one another are a radical from the group of hydrogen, methyl, ethyl, propyl, isopropyl, butyl, isobutyl, tert-butyl, phenyl, tolyl, vinyl or (3-triethoxysilyl)propyl, 3-(trimethoxysilylpropyl).

In another preferred embodiment the coating of the invention comprises polysilazanes of the formula (2)

$$-(SiR'R''-NR''')_n-(SiR*R-NR*)_p- \quad (2)$$

where R', R", R'", R*, R, and R* independently of one another are hydrogen or an unsubstituted or substituted alkyl, aryl, vinyl or (trialkoxysilyl)alkyl radical, n and p having values such that the polysilazane has a number-average molecular weight of 150 to 150 000 g/mol.

Particular preference is given to compounds in which
—R', R'" and R*** are hydrogen and R", R* and R** are methyl;
R', R'" and R*** are hydrogen and R" and R* are methyl and R** is vinyl;
R', R'", R* and R* are hydrogen and R" and R are methyl.

Likewise preferably used are polysilazanes of the formula (3)

$$-(SiR'R''-NR''')_n-(SiR*R-NR*)_p-(SiR^1,R^2-NR^3)_q- \quad (3)$$

where R', R", R'", R*, R, R*, $R^1$, $R^2$ and $R^3$ independently of one another are hydrogen or an unsubstituted or substituted alkyl, aryl, vinyl or (trialkoxysilyl)alkyl radical, the values of n, p and q being such that the polysilazane has a number-average molecular weight of 150 to 150 000 g/mol.

Particular preference is given to compounds in which R', R'" and R*** are hydrogen and R", R*, R** and $R^2$ are methyl, $R^3$ is (triethoxysilyl)propyl and $R^1$ is alkyl or hydrogen.

The fraction of polysilazane in the solvent is generally 1% to 80% by weight polysilazane, preferably 5% to 50% by weight, more preferably 10% to 40% by weight.

Because of the organic component in the polysilazane structure and because of the reduced Si—H content of the binder, the structures obtained are flexible. These systems are particularly suitable for coating already coated surfaces, since they possess a relatively high thermal expansion coefficient.

Solvents suitable for the polysilazane formulation are, in particular, organic solvents which contain no water and also no reactive groups (such as hydroxyl groups or amine groups). These solvents are, for example, aliphatic or aromatic hydrocarbons, halogenated hydrocarbons, esters such as ethyl acetate or butyl acetate, ketones such as acetone or methyl ethyl ketone, ethers such as tetrahydrofuran or dibutyl ether, and also mono- and polyalkylene glycol dialkyl ethers (glymes), or mixtures of these solvents.

An additional constituent of the polysilazane formulation may be further binders, of the kind customarily used for preparing coating materials. These further binders may be, for example, cellulose ethers and cellulose esters, such as ethylcellulose, nitrocellulose, cellulose acetate or cellulose acetoburyrate, natural resins such as rubber or rosins or synthetic resins, such as addition-polymerization resins or condensation resins, amino resins for example, especially urea- and melamine-formaldehyde resins, alkyd resins, acrylic resins, polyesters or modified polyesters, epoxides, polyisocyanates and blocked polyisocyanates or polysiloxanes.

A further constituent of the polysilazane formulation may be additives, which influence, for example, formulation viscosity, substrate wetting, film formation, lubricity or the flash-off characteristics, or inorganic nanoparticles such as $SiO_2$, $TiO_2$, ZnO, $ZrO_2$ or $Al_2O_3$, for example.

An additional constituent of the polysilazane formulation may be catalysts such as, for example, organic amines, acids and also metals or metal salts or mixtures of these compounds.

Catalysts are used preferably in amount of 0.001% to 10%, in particular 0.01% to 6%, more preferably 0.1% to 3%, based on the weight of the polysilazane.

Examples of amine catalysts are ammonia, methylamine, dimethylamine, trimethylamine, ethylamine, diethylamine, triethylamine, n-propylamine, isopropylamine, di-n-propylamine, diisopropylamine, tri-n-propylamine, n-butylamine, isobutylamine, di-n-butylamine, diisobutylamine, tri-n-butylamine, n-pentylamine, di-n-pentylamine, tri-n-pentylamine, dicyclohexylamine, aniline, 2,4-dimethylpyridine, 4,4-trimethylenebis(1-methylpiperidine), 1,4-diazabicyclo[2.2.2]octane, N,N-dimethylpiperazine, cis-2,6-dimethylpiperazine, trans-2,5-dimethylpiperazine, 4,4-methylenebis(cyclohexylamine), stearylamine, 1,3-di(4-piperidyl)propane, N,N-dimethylpropanolamine, N,N-dimethylhexanolamine, N,N-dimethyloctanolamine, N,N-diethylethanolamine, 1-piperidineethanol, and 4-piperidinol.

Examples of organic acids are acetic acid, propionic acid, butyric acid, valeric acid, and caproic acid.

Examples of metals and metal compounds as catalysts are palladium, palladium acetate, palladium acetylacetonate, palladium propionate, nickel, nickel acetylacetonate, silver powder, silver acetylacetonate, platinum, platinum acetylacetonate, ruthenium, ruthenium acetylacetonate, ruthenium carbonyls, gold, copper, copper acetylacetonate, aluminum acetylacetonate, and aluminum tris(ethyl acetoacetate).

Depending on the catalyst system used, the presence of moisture or of oxygen may play a part in the curing of the coating. For instance, through the choice of a suitable catalyst system, it is possible to achieve rapid curing at high or low atmospheric humidity or at high or low oxygen content. The skilled worker is familiar with these influences and will adjust the atmospheric conditions appropriately by means of suitable optimization methods.

The application of this polysilazane formulation is not confined to metal surfaces only, but can also be employed in particular for coated surfaces. In this case the polysilazane coating material can be applied directly to a basecoat or to a conventional clearcoat. These conventional coats may comprise either solvent borne coating systems or powder coatings. Owing to the smoothing properties and the favorable surface polarity, a high-gloss, easy-clean surface is obtained here.

The coating with the polysilazane formulation may take place by means of processes such as are conventionally employed in surface coating. The process in question may be, for example, spraying, dipping or flow coating. Afterward there may be a thermal aftertreatment, in order to accelerate the curing of the coating. Depending on the polysilazane formulation used and catalyst, curing takes place even at room temperature, but can be accelerated by heating. Thus it is possible to cure the polysilazane coat at 170° C. within 30 minutes.

Before the coating is applied it is possible first to apply a primary coat in order, for example, to improve the adhesion.

The invention therefore further provides a process for producing a protective coat on a wheel rim, the polysilazane solution with or without cobinder(s) being applied to the rim by suitable methods such as spraying or dipping, for example, and subsequently cured. The cured coating has a thickness of at least 1 micrometer, preferably 2 to 20 micrometers, more preferably 3 to 10 micrometers, and ensures outstanding protection of the surfaces against corrosion and scratching. On rims coated in this way the eating-in of brake dust is prevented, because the coating in question is a high-temperature-resistant topcoat. Owing to the smooth surface, cleaning is made considerably easier. The coating of the invention can also be applied to already coated surfaces, such as to rims to which clearcoat has already been applied, for example, in order to provide the rim with additional protection against scratching, corrosion or the eating-in of brake dust. Additionally there is an increase, following the application of the coating, in the gloss as compared with the clearcoat.

An alternative possibility is to do without the clearcoat and to apply the coating directly to the pigmented basecoat, which allows a saving to be made of one coating step.

In the case of nonprecoated materials, such as polished or bright-machined aluminum rims, for example, the polysilazane solution can also be used as a single protective coat, replacing the clearcoat normally employed.

Thus it is possible to produce a protective coat which has a much lower thickness than the conventional coats, in conjunction with lower consumption of material and lower emission of solvents, and which additionally has properties superior to those of the conventional coatings. Consequently the polysilazane coating possesses considerable economic and environmental advantages.

Because of the high reactivity of the polysilazane the coating cures in principle even at room temperature or below, but its curing can be accelerated by an increase in temperature. The coating is preferably cured at a temperature in the range from 10 to 200° C., preferably 80 to 170° C. The maximum possible curing temperature depends essentially on the substrate to which the coating is applied. In the case of metals such as aluminum relatively high temperatures are possible, of 180 to 200° C. or more, unless eloxed areas do not allow this. If the coating is applied to an existing coat (either basecoat or clearcoat), it is advisable to work at a lower temperature, so that the underneath coat does not soften, preferably at 25 to 180° C., more preferably at 80 to 170° C. If the substrate permits working at 160-170° C., then curing takes place within 15-30 minutes.

The curing of the coating is also affected by the atmospheric humidity. At relatively high humidity curing takes place more rapidly, which can be an advantage; conversely, curing in an atmosphere with only low humidity, such as in a drying cabinet, entails a slow and uniform curing process. Curing of the coating of the invention can therefore take place at a relative atmospheric humidity of from 0 to 100%.

Coating with the perhydropolysilazane formulation may be followed by further aftertreatment, which adapts the surface energy of the coating. In this way it is possible to produce either hydrophilic or hydrophobic surfaces, which influence the soiling propensity.

EXAMPLES

The polysilazanes used can be prepared from the corresponding dichlorosilanes by reaction with ammonia. Thus, for example, using ammonia, dimethylchlorosilane and methylchlorosilane, a random copolymer is obtained. The incorporation of corresponding, network-forming structures ensures curing of the coating material.

Parts and percentages in the examples below are by weight.

The aluminum rims are standard commercial aluminum rims which comprise either a solvent borne clearcoat or an acrylate powder clearcoat. The substrates used were parts of these rims obtained by sawing up complete rims, or else were metal test sheets with a comparable coating system.

Coating was carried out either by spraying with a standard commercial coating gun or by dipping in a standard commercial dipping apparatus.

Copolymers:

|  | —(CH$_3$)$_2$SiNH— | —(CH$_3$)HSiNH— | —(CH$_3$)$_2$SiNR— | —(CH$_3$)HSiNR— |
|---|---|---|---|---|
| Copolymer 1 | x | x | | |
| Copolymer 2 | x | x | x | x |
| Copolymer 3 | x | | x | |

Preparation of Coating Formulations

| Formulation 1 | |
|---|---|
| Copolymer 1 | 35-40% |
| Polyacrylate | 0.5-1% |
| Flow control additive | <2.0% |

The individual components are dissolved in butyl acetate and homogenized using a dissolver. The amount of butyl acetate is calculated such that a total of 100% coating formulation is obtained.

| Formulation 2 | |
|---|---|
| Copolymer 1 | 35-40% |
| Polyacrylate | 0.5-1% |
| Flow control additive | <2.0% |
| AMEO | <2.0% |

The individual components are dissolved in butyl acetate and homogenized using a dissolver. The amount of butyl acetate is calculated such that a total of 100% coating formulation is obtained.

| Formulation 3 | |
|---|---|
| Copolymer 2 | 35-40% |
| Polyacrylate | 0.5-1% |
| Flow control additive | <2.0% |
| AMEO | <2.0% |

The individual components are dissolved in butyl acetate and homogenized using a dissolver. The amount of butyl acetate is calculated such that a total of 100% coating formulation is obtained.

| Formulation 4 | |
|---|---|
| Copolymer 2 | 35-40% |
| Polyacrylate | 0.5-1% |
| Flow control additive | <2.0% |

The individual components are dissolved in butyl acetate and homogenized using a dissolver. The amount of butyl acetate is calculated such that a total of 100% coating formulation is obtained.

| Formulation 5 | |
|---|---|
| Copolymer 2 | 20-25% |
| Polyacrylate | 0.5-1% |
| Flow control additive | <2.0% |
| AMEO | <2.0% |
| Thickener | <5.0% |

The individual components are dissolved in butyl acetate and homogenized using a dissolver. The amount of butyl acetate is calculated such that a total of 100% coating formulation is obtained.

| Formulation 6 | |
|---|---|
| Copolymer 3 | 35-40% |
| Polyacrylate | 0.5-1% |
| Flow control additive | <2.0% |

The individual components are dissolved in butyl acetate and homogenized using a dissolver. The amount of butyl acetate is calculated such that a total of 100% coating formulation is obtained.

Application of the Coating Formulations

In the case of application via a spray gun the gun setting is to be selected such that the amount of coating material applied, the uniformity of the applied coating, and the sprayed thickness are optimum. These settings are known to the skilled worker.

Application takes place to coated Al samples and to aluminum wheel rims which have a corresponding multicoat system. The topmost coat in this system is an acrylate powder coating, a solvent borne clearcoat or aqueous clearcoat. As a preliminary, the samples are subjected accordingly to thorough cleaning and drying.

Curing takes place at a sample body temperature of 170° C. within 25 minutes. The heating rate is selected so that the solvent evaporates uniformly.

| | Coat thickness Si coating (μm) | Roughness Ra (μm) | Brake dust test (evaluation: see below) | Contact angle (against water) |
|---|---|---|---|---|
| Formulation 2 | 4 | 0.12 | 3 | 105 |
| Formulation 3 | 5 | 0.09 | 1 | 108 |
| Formulation 4 | 3 | 0.11 | 2 | 106 |
| Formulation 5 | 15 | 0.15 | 2 | 108 |
| Reference 1 | — | 0.45 | 4 | 85 |
| Reference 2 | — | 0.50 | 5 | 88 |

Reference 1:
Reference wheel rim, current rim coating, multicoat system with polyacrylate powder clearcoat
Reference 2:
Reference wheel rim, current rim coating, multicoat system with solvent borne clearcoat
Brake Dust Test:
Brake dust is suspended in water and applied to the sample body. The sample is subsequently stored at 160° C. for 2 hours, rinsed off with water, wiped down gently, and evaluated (school grades).

The invention claimed is:

1. A coating solution for metal surfaces, polymers or coating systems, comprising a solution of a polysilazane or a mixture of polysilazanes of the formula 1

$$-(SiR'R''-NR''')_n- \quad (1)$$

where R', R" and R'" are identical or different and independently of one another are hydrogen or an unsubstituted or substituted alkyl, aryl, vinyl or (trialkoxysilyl)alkyl radical, n being an integer and having a value such that the polysilazane or mixture of polysilazanes has a number-average molecular weight of 150 to 150000 g/mol, in a solvent wherein the coating composition further comprises a binder and which further comprises inorganic nanoparticles.

2. The coating as claimed in claim 1, wherein R', R" and R'" independently of one another are a radical selected from the group of consisting of hydrogen, methyl, ethyl, propyl, isopropyl, butyl, isobutyl, tert-butyl, phenyl, vinyl 3-(triethoxysilyl)propyl and 3-(trimethoxysilylpropyl).

3. The coating as claimed in claim 1, wherein the solution of a polysilazane or a mixture of polysilazanes has at least one polysilazane of the formula (2)

$$-(SiR'R''-NR''')_n-(SiR^*R^{}-NR^{*})_p- \quad (2)$$

where R', R", R'", R*, R, and R* independently of one another are hydrogen or an unsubstituted or substituted alkyl, aryl, vinyl or (trialkoxysilyl)alkyl radical, n and p being an integer and n having a value such that the polysilazane or mixture of polysilazanes has a number-average molecular weight of 150 to 150000 g/mol.

4. The coating solution as claimed in claim 3, wherein
R', R'" and R*** are hydrogen and R", R* and R** are methyl;
R', R'" and R*** are hydrogen and R" and R* are methyl and R** is vinyl; or
R', R'", R* and R* are hydrogen and R" and R are methyl.

5. The coating solution as claimed in claim 1, wherein the solution of a polysilazane or a mixture of polysilazanes has at least one polysilazane of the formula (3)

$$-(SiR'R''-NR''')_n-(SiR^*R^{}-NR^{*})_p-(SiR^1R^2-NR^3)_q- \quad (3)$$

where R', R", R'", R*, R, R*, R¹, R² and R³ independently of one another are hydrogen or an unsubstituted or substituted alkyl, aryl, vinyl or (trialkoxysilyl)alkyl radical, n, p and q being integers and n having a value such that the polysilazane or mixture of polysilazanes has a number-average molecular weight of 150 to 150000 g/mol.

6. The coating solution as claimed in claim 5, wherein R', R'" and R*** are hydrogen and R", R*, R** and R² are methyl, R³ is (triethoxysilyl)propyl and R¹ is alkyl or hydrogen.

7. The coating solution as claimed in claim 1, wherein the solution of a polysilazane or a mixture of polysilazanes contains 1% to 80% by weight of the polysilazane.

8. The coating solution as claimed in claim 1, wherein the solution of a polysilazane or a mixture of polysilazanes contains 0.001% to 10% by weight of at least one catalyst.

9. The coating solution as claimed in claim 8, wherein the at least one catalyst is selected from the group consisting of organic amines, acids, metals, metal salts and mixtures thereof.

10. The coating solution as claimed in claim 8, wherein the solvent is an anhydrous organic solvent containing no reactive groups.

11. The coating solution as claimed in claim 1, where the binder is selected from a group consisting of cellulose ethers, cellulose esters, rubbers, rosins, amino resins, alkyd resins, acrylic resins, polyacrylates, polyesters, polyisocyanates, blocked polyisocyanates and polysiloxanes.

12. The permanent coating as claimed in claim 1, wherein the solution of a polysilazane or a mixture of polysilazanes contains 5% to 50% by weight of the polysilazane.

13. The permanent coating as claimed in claim 1, wherein the solution of a polysilazane or a mixture of polysilazanes contains 10% to 40% by weight of the polysilazane.

14. The coating solution of claim 1 where the binder is polyacrylate.

15. An article with a metal surface, polymer surface or coating surface coated with a permanent coating as set forth in claim 1.

16. The article as claimed in claim 15, wherein the metal surface is selected from the group consisting of alloys of iron, steel, galvanized steel, aluminum, chromium, nickel, zinc, titanium, vanadium, molybdenum, magnesium and copper.

17. The article as claimed in claim 15, wherein the polymer surface is selected from the group consisting of polycarbonate, polymethyl methacrylate, polyether ether ketone, polyethylene, polypropylene, polyamide and polyethylene terephthalate.

18. The article as claimed in claim 15, wherein the coating surface is an acrylate-based, epoxy-based or urethane-based coating.

19. An article with a polymer surface coated with a coating solution comprising a solution of a polysilazane or a mixture of polysilazanes of the formula 1

$$-(SiR'R''-NR''')_n- \quad (1)$$

where R', R" and R'" are identical or different and independently of one another are hydrogen or an unsubstituted or substituted alkyl, arly, vinyl or (trialkoxysilyl)alkyl radical, n being an integer and having a value such that the polysilazane or mixture of polysilazanes has a number-average molecular weight of 150 to 150000 g/mol, in a solvent wherein the coating composition further comprises a binder and wherein the polymer surface is selected from the group consisting of polycarbonate, polymethyl methacrylate, polyether ether ketone, polyethylene, polypropylene, polyamide and polyethylene terephthalate and wherein the coating surface is an acrylate-based, epoxy-based or urethane-based coating.

20. An article with a coated surface coated with a coating solution comprising a solution of a polysilazane or a mixture of polysilazanes of the formula 1

where R', R" and R"' are identical or different and independently of one another are hydrogen or an unsubstituted or substituted alkyl, arly, vinyl, or (trialkoxysilyl)alkyl radical, n being an integer and having a value such that the polysilazane or mixture of polysilazanes has a number-average molecular weight of 150 to 150000 g/mol, in a solvent wherein the coating composition further comprises a binder and wherein the coating surface is an acrylate-based, epoxy-based or urethane-based coating.

21. A method of producing a coating on a metal surface or a polymer surface, comprising the steps of applying a solution comprising a polysilazane or a mixture of polysilazanes of the formula (1)

where R', R" and R"' are identical or different and independently of one another are hydrogen or an unsubstituted or substituted alkyl, aryl or (trialkoxysilyl)alkyl radical, n being an integer and having a value such that the polysilazane or mixture of polysilazanes has a number-average molecular weight of 150 to 150 000 g/mol, in a solvent to a metal surface to form a coating and curing the coating, wherein the solution further comprises a binder and which further comprises inorganic nanoparticles.

* * * * *